(12) United States Patent
Park

(10) Patent No.: US 9,602,326 B2
(45) Date of Patent: Mar. 21, 2017

(54) APPARATUS AND METHOD FOR TRANSMITTING SIGNAL, APPARATUS AND METHOD FOR RECEIVING SIGNAL

(71) Applicant: Gangneung-Wonju National University Industry Academy Cooperation Group, Gangneung-si, Gangwon (KR)

(72) Inventor: Sung Joon Park, Gangneung-si (KR)

(73) Assignee: Gangneung-Wonju National University Indsutry Academy Cooperation Group, Gangwon (KR)

(*) Notice: Subject to any disclaimer, the term of this patent is extended or adjusted under 35 U.S.C. 154(b) by 0 days.

(21) Appl. No.: 14/757,962

(22) Filed: Dec. 23, 2015

(65) Prior Publication Data

US 2016/0204972 A1 Jul. 14, 2016

(30) Foreign Application Priority Data

Jan. 12, 2015 (KR) .................. 10-2015-0004249

(51) Int. Cl.
| | |
|---|---|
| *H04L 27/36* | (2006.01) |
| *H04L 27/38* | (2006.01) |
| *H04L 27/00* | (2006.01) |
| *H04L 27/34* | (2006.01) |

(52) U.S. Cl.
CPC .......... *H04L 27/36* (2013.01); *H04L 27/0012* (2013.01); *H04L 27/3433* (2013.01); *H04L 27/3455* (2013.01); *H04L 27/362* (2013.01); *H04L 27/38* (2013.01)

(58) Field of Classification Search
CPC ....... H04L 27/36; H04L 27/38; H04L 27/362; H04L 27/3433; H04L 27/3455; H04L 27/0012; H04L 27/3854
See application file for complete search history.

(56) References Cited

U.S. PATENT DOCUMENTS

| | | | | |
|---|---|---|---|---|
| 2002/0186778 A1* | 12/2002 | Agami | .................. | H04L 1/0041 375/261 |
| 2008/0247470 A1* | 10/2008 | Wang | .................... | H04L 1/0045 375/241 |
| 2012/0140612 A1* | 6/2012 | Petrov | .................. | H04J 11/0063 370/207 |
| 2012/0250805 A1* | 10/2012 | Shin | ...................... | H04L 1/0054 375/341 |
| 2014/0269861 A1* | 9/2014 | Eliaz | ........................ | H04B 1/16 375/219 |

FOREIGN PATENT DOCUMENTS

| | | |
|---|---|---|
| KR | 10-0776976 B1 | 11/2007 |
| KR | 10-1093946 B1 | 12/2011 |

* cited by examiner

*Primary Examiner* — Syed Haider
(74) *Attorney, Agent, or Firm* — Knobbe Martens Olson & Bear LLP

(57) ABSTRACT

An apparatus for transmitting a signal in accordance with an embodiment of the present invention includes a mapper configured to map a modulation symbol to a bit signal by referencing the constellation. The constellation includes a plurality of blocks, and each block includes constellation points, each of which has in-phase (I) axis component value and quadrature-phase (Q) axis component value whose difference from the I axis or Q axis component value of a reference point of the block is a first difference value or a second difference value.

5 Claims, 6 Drawing Sheets

APPARATUS AND METHOD FOR TRANSMITTING SIGNAL, APPARATUS AND METHOD FOR RECEIVING SIGNAL

CROSS-REFERENCE TO RELATED APPLICATIONS

This application claims the benefit under 35 USC 119(a) of Korean Patent Application No. 10-2015-0004249, filed with the Korean Intellectual Property Office on Jan. 12, 2015, the disclosure of which is incorporated herein by reference in its entirety.

BACKGROUND

1. Field

The present invention relates to a method for transmitting a signal, particularly to methods and apparatuses for transmitting and receiving a high-order modulated signal.

2. Description of Related Art

One of the most representative methods of digital modulation methods is quadrature amplitude modulation (QAM), in which a digital signal constituted with bit strings is modulated by sorting the bit string into groups of predetermined bits and modifying the amplitude and phase of a carrier signal.

Digital modulation methods use a constellation that indicates a distance between a digital signal and a neighboring signal. The QAM method using the constellation is advantageous for reducing an average power consumption while maintaining the conventional modulation symbol error probability.

That is, the QAM method is the representative high-order modulation method used for improvement of transmission speed, and an M-ary (=$2^m$) QAM symbol can transfer m bits of information. Accordingly, if a hexadecimal QAM is used, each modulation symbol can transfer 4 bits of gray-mapped different information. Moreover, since each modulation symbol has to be at an intersecting point of a square lattice, the I-axis and Q-axis coordinates of the modulation symbol for the hexadecimal QAM are fixed numbers of $\pm^d$ or $\pm^{3d}$, whereas d is a real number of 0 or greater.

SUMMARY

The present invention provides apparatuses and methods for transmitting and receiving a signal using a constellation in which positions of constellation points are dynamically configured.

According to an aspect of the present invention, an apparatus for transmitting a signal includes: a constellation providing part having a constellation stored therein; a mapper configured to map a modulation symbol to a bit signal by referencing the constellation; and a transmitting part configured to generate a signal corresponding to the modulation symbol and transmit the signal to a receiving apparatus. The constellation includes a plurality of blocks, each of which includes 4 constellation points, and each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value.

The reference point may be a point included in each block whose I axis and Q axis component value is the smallest.

A value obtained by having the second difference value divided by the first difference value may be greater than 1 and smaller than 3, or is greater than 3, and wherein a value obtained by adding the first difference value to the second difference value may be a latitudinal or longitudinal length of the block.

The constellation providing part may be configured to generate the constellation having the first difference value and the second difference value configured therein according to at least one of an input by a user, a channel state and a transmitting method of the signal.

According to another aspect of the present invention, an apparatus for receiving a signal includes: a receiving part configured to receive a signal; a demapper configured to extract a reception symbol from the signal; a constellation providing part having a constellation stored therein; a log-likelihood ratio computing part configured to compute a log-likelihood ratio corresponding to the reception symbol by referencing the constellation; and a decoding part configured to decode the reception symbol based on the log-likelihood ratio. The constellation includes a plurality of blocks, each of which includes 4 constellation points, and each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value.

The constellation providing part may be configured to generate the constellation based on a difference value ratio included in the signal or based on the first difference value and the second difference value.

According to another aspect of the present invention, a method of transmitting a signal by an apparatus for transmitting a signal involves: mapping a modulation symbol to a bit signal by referencing a constellation; and generating a signal corresponding to the modulation symbol and transmitting the generated signal to a receiving apparatus. The constellation includes a plurality of blocks, each of which includes 4 constellation points, and each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value.

According to another aspect of the present invention, a method of receiving a signal by an apparatus for receiving a signal involves: extracting a reception symbol from a signal; computing a log-likelihood ratio corresponding to the reception symbol by referencing a constellation; and decoding the reception symbol according to the log-likelihood. The constellation includes a plurality of blocks, each of which includes 4 constellation points, and each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value.

DETAILED DESCRIPTION

Figure 1:
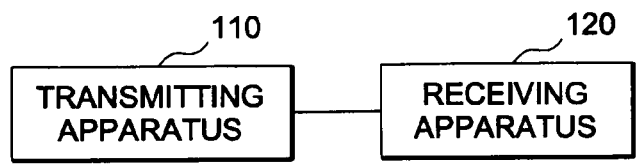
FIG. 1 is a block diagram illustrating a transmitting apparatus and a receiving apparatus in accordance with an embodiment of the present invention.

Since there can be a variety of permutations and embodiments of the present invention, a certain embodiment will be illustrated and described with reference to the accompanying drawings. This, however, is by no means to restrict the present invention to the certain embodiment, and shall be construed as including all permutations, equivalents and substitutes covered by the ideas and scope of the present invention.

Throughout the description of the present invention, when describing a certain relevant conventional technology is determined to evade the point of the present invention, the pertinent detailed description will be omitted. Terms such as "first" and "second" can be used in describing various elements, but the above elements shall not be restricted to the above terms. The above terms are used only to distinguish one element from the other.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, a certain embodiment will be described in detail with reference to the accompanying drawings. Identical or corresponding elements will be given the same reference numerals, regardless of the figure number, and any redundant description of the identical or corresponding elements will not be repeated.

FIG. 1 is a block diagram illustrating a transmitting apparatus and a receiving apparatus in accordance with an embodiment of the present invention.

Referring to FIG. 1, a transmitting apparatus 110 in accordance with an embodiment of the present invention generates a signal through a predetermined constellation after receiving a bit signal indicating bit strings and sends the generated signal to a receiving apparatus 120.

The receiving apparatus 120 receives the signal from the transmitting apparatus 110, computes a log-likelihood ratio through the predetermined constellation and decodes the signal according to the log-likelihood ratio.

Hereinafter, the transmitting apparatus 110 in accordance with an embodiment of the present invention will be described in detail with reference to FIG. 2 to FIG. 5.

Figure 2:
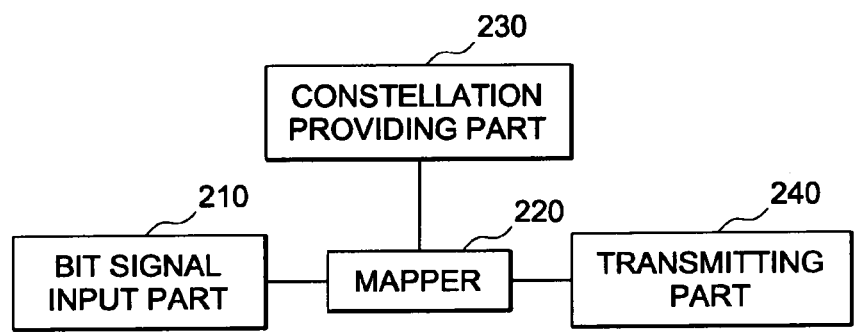
FIG. 2 is a block diagram illustrating the transmitting apparatus in accordance with an embodiment of the present invention.
Figure 3:
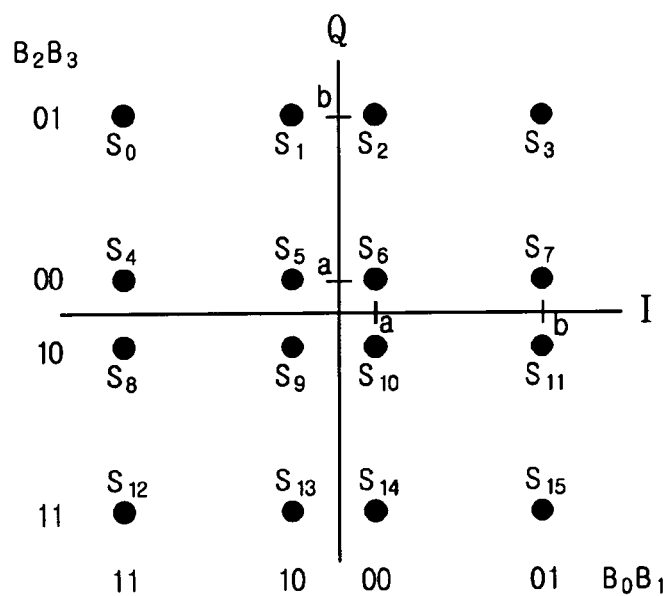
FIG. 3 is a constellation for hexadecimal quadrature amplitude modulation used by the transmitting apparatus in accordance with an embodiment of the present invention.
Figure 4:
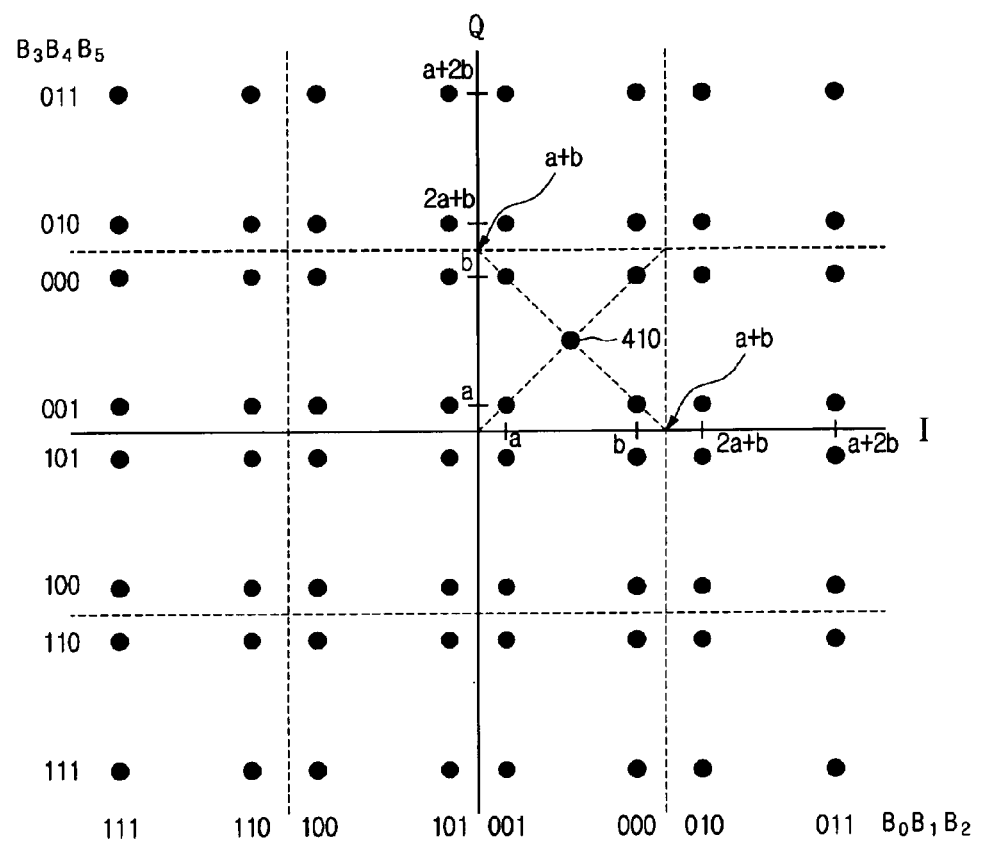
FIG. 4 is a constellation for 64-ary quadrature amplitude modulation used by the transmitting apparatus in accordance with an embodiment of the present invention.
Figure 5:
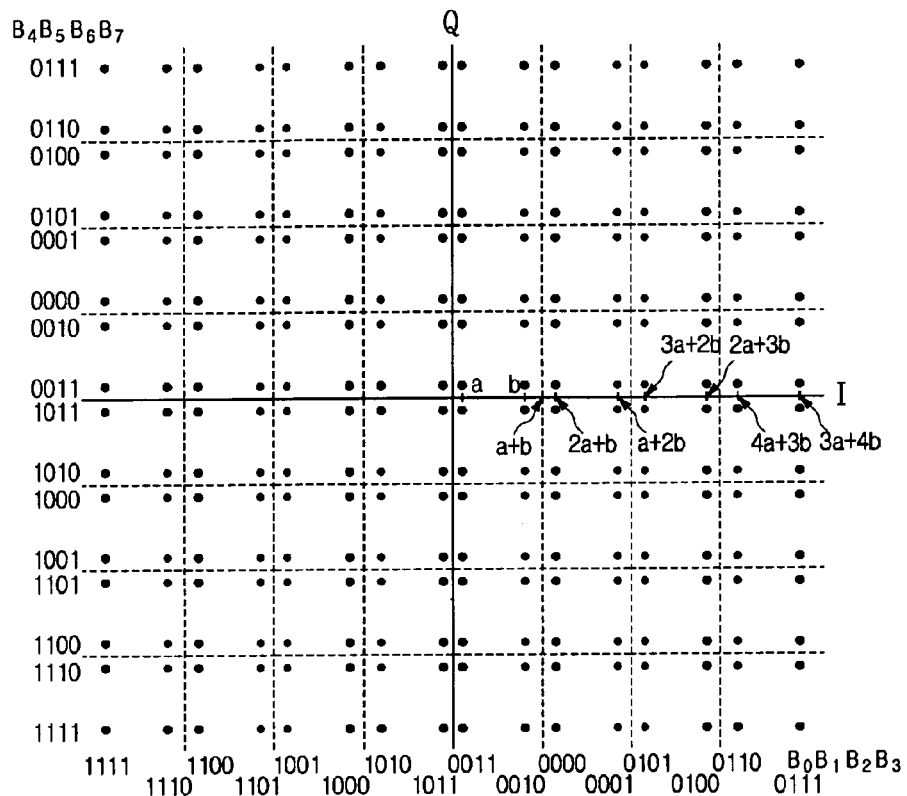
FIG. 5 is a constellation for 256-ary quadrature amplitude modulation used by the transmitting apparatus in accordance with an embodiment of the present invention.

FIG. 2 is a block diagram illustrating the transmitting apparatus 110 in accordance with an embodiment of the present invention. FIG. 3 is a constellation for hexadecimal quadrature amplitude modulation used by the transmitting apparatus 110 in accordance with an embodiment of the present invention. FIG. 4 is a constellation for 64-ary quadrature amplitude modulation used by the transmitting apparatus 110 in accordance with an embodiment of the present invention. FIG. 5 is a constellation for 256-ary quadrature amplitude modulation used by the transmitting apparatus 110 in accordance with an embodiment of the present invention.

Referring to FIG. 2, the transmitting apparatus 110 in accordance with an embodiment of the present invention includes a bit signal input part 210, a mapper 220, a constellation providing part 230 and a transmitting part 240.

The bit signal input part 210 receives a bit signal from an external device. Here, the bit signal may be a signal indicating one or more bits. The bit signal input part 210 sends the bit signal to the mapper 220.

The mapper 220 maps a modulation symbol, which is a constellation point corresponding to the bit signal, to the bit signal according to a constellation stored in the constellation providing part 230.

The constellation providing part 230 has the predetermined constellation stored therein, and the mapper 220 may refer to the constellation stored in the constellation providing part 230. Here, the constellation includes a plurality of blocks, each of which includes 4 constellation points, as illustrated in FIG. 3 to FIG. 5. Moreover, each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value. Here, the reference point of each block refers to a point among the points included in each block whose I axis and Q axis component value is the smallest. For example, if a coordinate of the reference point of a particular block is (x,y) and the first difference value and the second difference value are "a" and "b," respectively, "a" and "b" being a real number, the constellation points included in the block may be positioned at (x+a, y+a), (x+a, y+b), (x+b, y+a) and (x+b, y+b). Here, a value obtained by having the second difference value divided by the first difference value (hence, "difference value ratio" hereinafter) may be greater than 1 (i.e., b/a>1), and a value obtained by adding the first difference value to the second difference value (hence, "added difference value" hereinafter) may be a latitudinal or longitudinal length of the very block (i.e., a+b =latitudinal or longitudinal length of the block). Here, each constellation point included in each block may be symmetrical with another constellation point included in the very block about a center point of the very block. The center point may be a point at which two diagonal lines, each of which is connected from one vertex to a diagonally opposite vertex, interest with each other (e.g., reference numeral 410 in FIG. 4).

Referring to FIG. 3, the constellation for hexadecimal quadrature amplitude modulation (QAM) used by the transmitting apparatus 110 in accordance with an embodiment of the present invention may include a total of 16 constellation points ($S_0$ to $S_{15}$) in 4 blocks of predetermined size, and the constellation points may be positioned at positions where the first difference value is "a" and the second difference value is "b." A bit string ($B_0$, $B_1$, $B_2$, $B_3$) having 4 bits ($B_0$, $B_1$, $B_2$, $B_3$) may be configured for each constellation point of the constellation.

Referring to FIG. 4, the constellation for 64-ary QAM used by the transmitting apparatus 110 in accordance with an embodiment of the present invention may include a total of 64 constellation points in 16 blocks of predetermined size, and the constellation points may be positioned at positions where the first difference value is "a" and the second difference value is "b." A bit string having six bits ($B_0$, $B_1$, $B_2$, $B_3$, $B_4$, $B_5$) may be configured for each constellation point of the constellation.

Referring to FIG. 5, the constellation for 256-ary QAM used by the transmitting apparatus 110 in accordance with an embodiment of the present invention may include a total of 256 constellation points in 64 blocks of predetermined size, and the constellation points may be positioned at positions where the first difference value is "a" and the second difference value is "b." A bit string having eight bits ($B_0$, $B_1$, $B_2$, $B_3$, $B_4$, $B_5$, $B_6$, $B_7$) may be configured for each constellation point of the constellation.

Moreover, the transmitting apparatus 110 in accordance with an embodiment of the present invention may use a constellation for QAM of 1024-ary or more, in addition to the above-described constellations for hexadecimal, 64-ary and 256-ary QAM.

Moreover, the first difference value and the second difference value may be configured variously as long as the difference value ratio is greater than 1 and smaller than 3 and the sum of the first difference value and the second difference value is the latitudinal or longitudinal length of the very block. Alternatively, the first difference value and the second difference value may be configured variously as long as the difference value ratio is greater than 3 and the sum of the first difference value and the second difference value is the latitudinal or longitudinal length of the very block.

Here, the constellation providing part 230 may receive a difference value ratio (or first difference value and second difference value) from a user and generate a constellation according to the received difference value ratio (or first difference value and second difference value). Alternatively, the constellation providing part 230 may compute a channel state (Es/N0) between the pertinent transmitting part 240 and the receiving apparatus 120 and generate a constellation according to the difference value ratio (or first difference value and second difference value) corresponding to the channel state. Here, the channel state may be computed using a known method such as, for example, using a pilot signal. Alternatively, the constellation providing part 230 may store a predetermined difference value ratio (or first difference value and second difference value) according to a transmission method based on a modulation index, channel coding and the like used by the transmitting part 240, and in case the transmission method is changed, the constellation providing part 230 may generate a constellation according to a difference value ratio (or first difference value and second difference value) corresponding to the changed transmission method.

Referring to FIG. 2 again, the transmitting part 240 generates a signal according to the modulation symbol and sends the signal to the receiving apparatus 120. For example, the transmitting part 240 generates the signal according to I axis and Q axis component values of the modulation symbol and sends the signal to the receiving apparatus 120. Here, the signal may include the difference value ratio (or first difference value and second difference value) of the constellation generated by the constellation providing part 230.

Figure 6:
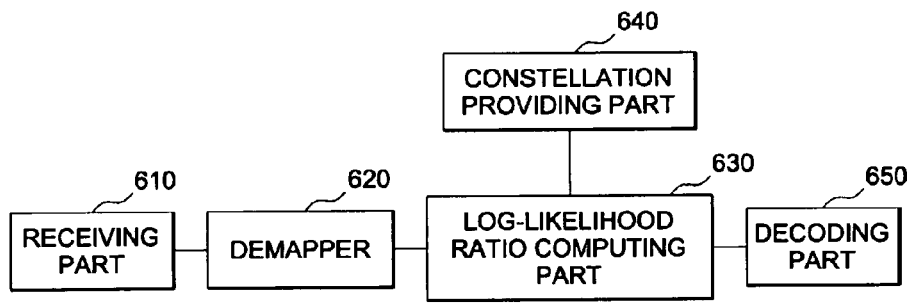
FIG. 6 is a block diagram illustrating the receiving apparatus in accordance with an embodiment of the present invention.

FIG. 6 is a block diagram illustrating the receiving apparatus 120 in accordance with an embodiment of the present invention.

Referring to FIG. 6, the receiving apparatus 120 in accordance with an embodiment of the present invention includes a receiving part 610, a demapper 620, a log-likelihood ratio computing part 630, a constellation providing part 640 and a decoding part 650.

The receiving part 610 receives the signal from the transmitting apparatus 110. The receiving part 610 sends the signal to the demapper 620.

The demapper 620 extracts a symbol (referred to as "reception symbol" hereinafter) from the signal.

The log-likelihood ratio computing part 630 computes a log-likelihood ratio based on a predetermined equation, using the reception symbol extracted from the signal by the demapper 620 and a modulation symbol (referred to as "storage symbol" hereinafter) stored in the constellation providing part 640. The log-likelihood ratio computing part 630 sends the log-likelihood ratio to the decoding part 650.

For example, the log-likelihood ratio computing part 630 may obtain a bit-level log-likelihood ratio (LLR) value, through a computation using the following Equation 1, for a signal transmitted by an M-ary (M being $2^m$) high-order modulation in which each modulation symbol includes an m bits of information, m being a natural number.

$$L_k = \log \frac{\sum_{b_k=1} \exp\left[-\frac{|r-s|^2}{2\sigma^2}\right]}{\sum_{b_k=0} \exp\left[-\frac{|r-s|^2}{2\sigma^2}\right]}, k = m-1, \ldots, 1, 0 \quad \text{[Equation 1]}$$

Here, r refers to a base band reception symbol, and s refers to one of M storage symbols including m bits ($b_{m-1}, \ldots, b_1, b_0$), and $\sigma^2$ refers to dispersion of additive white Gaussian noise occurred during transmission.

Here, the method of computing the LLR may be realized to be different from the above example. Moreover, the log-likelihood ratio computing part 630 may send the difference value ratio (or first difference value and second difference value) included in the signal to the constellation providing part 640.

The constellation providing part 640 has a constellation, which is to be referenced while decoding the reception symbol, stored therein. Here, the constellation providing part 640 may have at least one of the constellations, which are described with reference to FIG. 2 to FIG. 5, stored therein. Moreover, the constellation providing part 640 may generate a constellation based on the difference value ratio (or first difference value and second difference value) received from the log-likelihood ratio computing part 630 and provide the generated constellation to the long-likelihood ratio computing part 630.

The decoding part 650 decodes the reception symbol based on the LLR. That is, the decoding part 650 may generate and output a bit signal that is identical with the bit signal inputted to the transmitting apparatus 110 described above with reference to FIG. 2, by decoding reception symbol.

Figure 7:
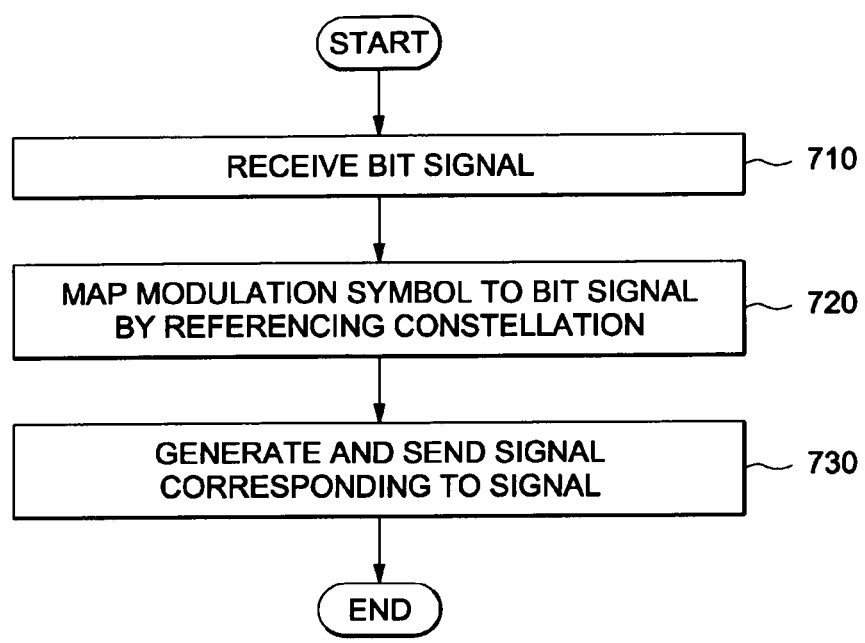
FIG. 7 illustrates how the transmitting apparatus in accordance with an embodiment of the present invention transmits a signal.

FIG. 7 illustrates how the transmitting apparatus 110 in accordance with an embodiment of the present invention transmits a signal. Although the steps described hereinafter are performed through their respective functional units constituting the transmitting apparatus 110, these functional units will be collectively referred to as the transmitting apparatus 110, for the sake of clear and concise description of the invention.

Referring to FIG. 7, the transmitting apparatus 110 receives a bit signal, in step 710.

In step 720, the transmitting apparatus 110 maps a modulation symbol to the bit signal by referencing a constellation. Here, the constellation includes a plurality of blocks, each of which includes 4 constellation points, as illustrated in FIG. 3 to FIG. 5. Moreover, each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value. Here, the transmitting apparatus 110 may receive a difference value ratio (or first difference value and second difference value) from a user and generate a constellation according to the received difference value ratio (or first difference value and second difference value). Alternatively, the transmitting apparatus 110 may compute a channel state (Es/N0) between the pertinent transmitting part 240 and the receiving apparatus 120 and generate a constellation according to the difference value ratio (or first difference value and second difference value) corresponding to the channel state. Here, the channel state may be computed using a known method such as, for example, using a pilot signal. Alternatively, the transmitting apparatus 110 may store a predetermined difference value ratio (or first difference value and second difference value) according to a transmission method based on a modulation index, channel coding and the like used by the transmitting part 240, and in case the transmission method is changed, the transmitting apparatus 110 may generate a constellation according to a difference value ratio (or first difference value and second difference value) corresponding to the changed transmission method.

In step 730, the transmitting apparatus 110 generates a signal corresponding to the modulation symbol and sends the generated signal to the receiving apparatus 120. Here, the signal may additionally include the difference value ratio (or first difference value and second difference value).

Figure 8:
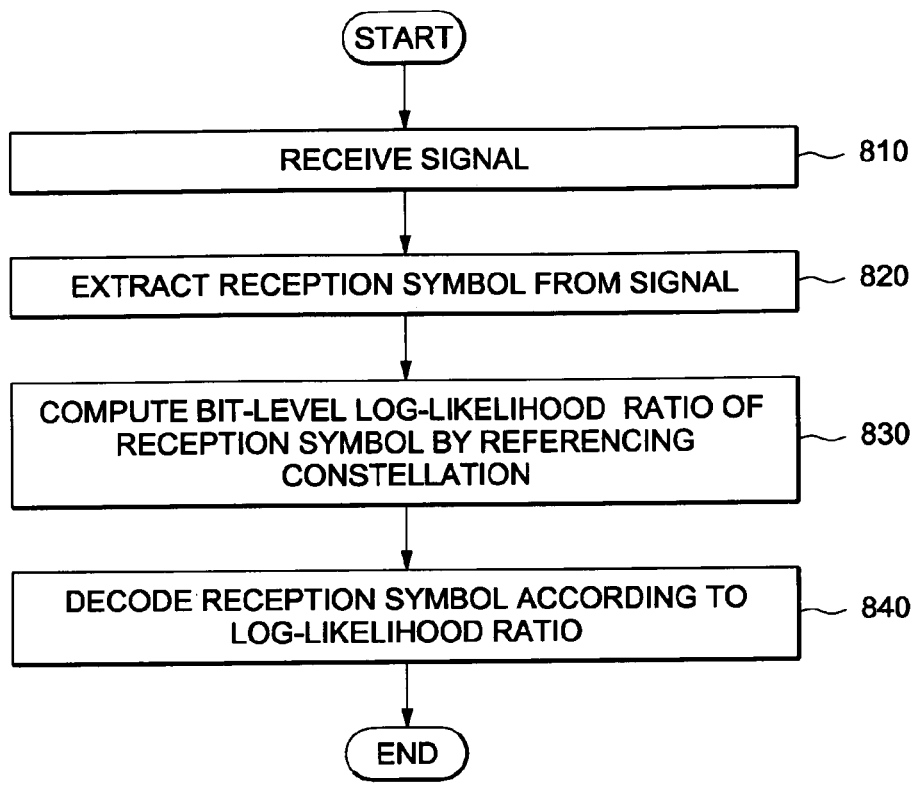
FIG. 8 illustrates how the receiving apparatus in accordance with an embodiment of the present invention receives a signal.

FIG. 8 illustrates how the receiving apparatus in accordance with an embodiment of the present invention receives a signal. Although the steps described hereinafter are performed through their respective functional units constituting the receiving apparatus 120, these functional units will be collectively referred to as the receiving apparatus 120, for the sake of clear and concise description of the invention.

In step 810, the receiving apparatus 120 receives a signal from the transmitting apparatus 110.

In step 820, the receiving apparatus 120 extracts a reception symbol from the signal.

In step 830, the receiving apparatus 120 computes a bit-level log-likelihood ratio of the reception symbol, by referencing a constellation. Here, the constellation includes a plurality of blocks, each of which includes 4 constellation points, as illustrated in FIG. 3 to FIG. 5. Moreover, each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value. Moreover, the receiving apparatus 120 may compute the log-likelihood ratio through Equation 1 described above. Here, the receiving apparatus 120 may generate a constellation based on the difference value ratio (or first difference value and second difference value) included in the signal and compute the bit-level log-likelihood ratio by referencing the generated constellation.

In step 840, the receiving apparatus 120 decodes the reception symbol according to the log-likelihood ratio. Here, the reception symbol may be decoded according to the log-likelihood ratio using a known decoding method.

Figure 9:
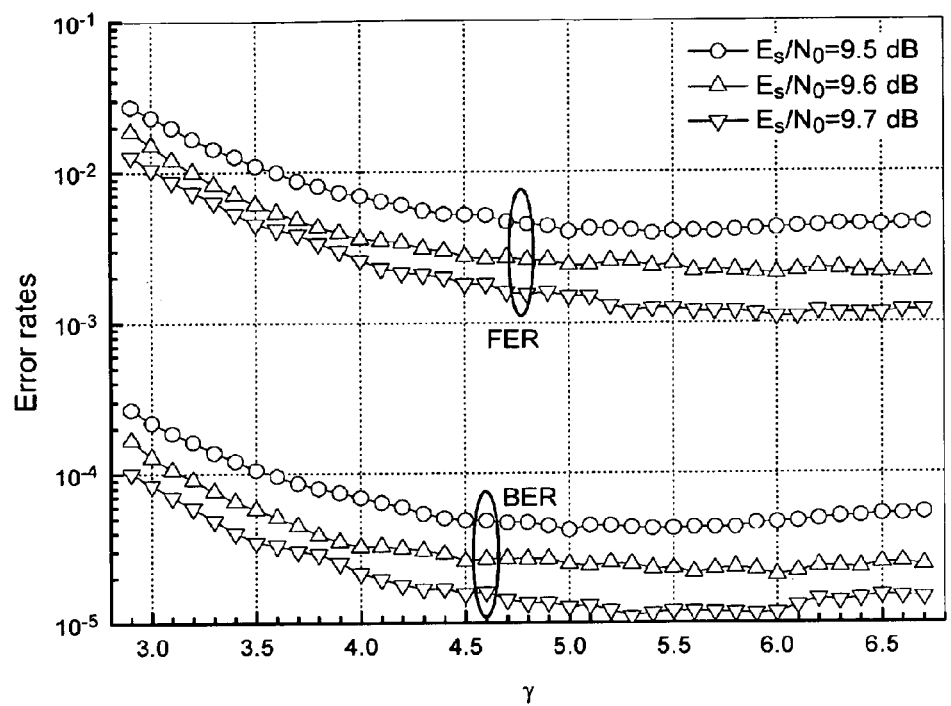
FIG. 9 is a graph showing bit error rates (BER) and frame error rates (FER) when a signal transmitted by the transmitting apparatus is received and decoded by the receiving apparatus in accordance with an embodiment of the present invention.

FIG. 9 is a graph showing bit error rates (BER) and frame error rates (FER) when the signal transmitted by the transmitting apparatus 110 is received and decoded by the receiving apparatus 120 in accordance with an embodiment of the present invention.

Referring to FIG. 9, it can be seen that the BER and the FER vary according to the difference value ratio when the receiving apparatus 120 in accordance with an embodiment of the present invention decodes the signal.

In other words, by using a constellation having a difference value ratio applied differently thereto, the transmitting apparatus 110 and the receiving apparatus 120 in accordance with an embodiment of the present invention may transmit a signal with a lowered bit error rate and frame error rate.

The transmitting method and the receiving method in accordance with an embodiment of the present invention may be embodied in the form of program instructions, which can be performed through various electronic data processing means, and may be written in a storage medium, which can include program instructions, data files, data structures and the combination thereof.

The program instructions stored in the storage medium may be designed and configured specifically for the present invention or may be publicly known and available to those who are skilled in the field of software. Examples of the storage medium may include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media may be transmission media, such as optical or metal lines and a waveguide, which include a carrier wave that transmits a signal designating program instructions, data structures, etc. Examples of the program instructions may include machine codes made by, for example, a compiler, as well as high-language codes that may be executed by an electronic data processing device, for example, a computer, by using an interpreter. The above hardware devices may be configured to operate as one or more software modules in order to perform the operation of the present invention, and the opposite is also possible.

The above hardware devices may be configured to operate as one or more software modules in order to perform the operation of the present invention, and the opposite is also possible.

Although a certain embodiment of the present invention has been described, it shall be appreciated by those who are ordinarily skilled in the art to which the present invention pertains that various modifications and permutations of the present invention are possible without departing from the technical ideas and scopes of the present invention, which shall be defined by the claims appended below. It shall be also appreciated that such modifications and/or permutations and equivalents thereof are also included in the claimed scope of the present invention.

What is claimed is:

1. An apparatus for transmitting a signal, comprising:
    a constellation providing part having a constellation stored therein;
    a mapper configured to map a modulation symbol to a bit signal by referencing the constellation; and
    a transmitting part configured to generate a signal corresponding to the modulation symbol and transmit the signal to a receiving apparatus,
    wherein the constellation includes a plurality of blocks, each of which includes 4 constellation points, and each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value,
    wherein a difference value ratio obtained by having the second difference value divided by the first difference value is greater than 1, and wherein an added difference value obtained by adding the first difference value to the second difference value is a latitudinal or longitudinal length of the block.

2. The apparatus as set forth in claim 1, wherein the reference point is a point included in each block whose I axis and Q axis component value is the smallest.

3. The apparatus as set forth in claim 1, wherein the constellation providing part is configured to generate the constellation having the first difference value and the second difference value configured therein according to at least one of an input by a user, a channel state and a transmitting method of the signal.

4. A method of transmitting a signal by an apparatus for transmitting a signal, comprising:
    mapping a modulation symbol to a bit signal by referencing a constellation; and
    generating a signal corresponding to the modulation symbol and transmitting the generated signal to a receiving apparatus,
    wherein the constellation includes a plurality of blocks, each of which includes 4 constellation points, and each block includes constellation points, each of which has an in-phase (I) axis component value whose difference from the I axis component value of a reference point of the block is a first difference value or a second difference value and has a quadrature-phase (Q) axis component value whose difference from the Q axis component value of the reference point of the block is the first difference value or the second difference value,
    wherein a difference value ratio obtained by having the second difference value divided by the first difference value is greater than 1, and wherein an added difference value obtained by adding the first difference value to the second difference value is a latitudinal or longitudinal length of the block.

5. The method as set forth in claim 4, wherein the reference point is a point included in each block whose I axis and Q axis component value is the smallest.

* * * * *